US012791721B2

(12) United States Patent
Eltaher

(10) Patent No.: US 12,791,721 B2
(45) Date of Patent: Nov. 10, 2026

(54) METHOD AND DEVICE FOR ACQUIRING IMAGE DATA

(71) Applicant: Hybrid Lidar Systems AG, Bad Salzdetfurth (DE)

(72) Inventor: Amr Eltaher, Braunschweig (DE)

(73) Assignee: HYBRID LIDAR SYSTEMS AG, Bad Salzdetfurth (DE)

(*) Notice: Subject to any disclaimer, the term of this patent is extended or adjusted under 35 U.S.C. 154(b) by 1040 days.

(21) Appl. No.: 17/995,773

(22) PCT Filed: Apr. 8, 2021

(86) PCT No.: PCT/EP2021/059231
§ 371 (c)(1),
(2) Date: Oct. 7, 2022

(87) PCT Pub. No.: WO2021/204968
PCT Pub. Date: Oct. 14, 2021

(65) Prior Publication Data
US 2023/0168380 A1 Jun. 1, 2023

(30) Foreign Application Priority Data
Apr. 9, 2020 (DE) ......................... 102020110052.3

(51) Int. Cl.
*G01S 17/894* (2020.01)
*G01S 7/484* (2006.01)
*G01S 7/4863* (2020.01)

(52) U.S. Cl.
CPC ............ *G01S 17/894* (2020.01); *G01S 7/484* (2013.01); *G01S 7/4863* (2013.01)

(58) Field of Classification Search
CPC ...... G01S 17/894; G01S 7/484; G01S 7/4863; G01S 17/10; G01S 17/42; G01S 7/4815; G01S 7/4861; G01S 7/4816; G01S 17/89; G01S 7/4817; G01S 7/4868
See application file for complete search history.

(56) References Cited

U.S. PATENT DOCUMENTS

2007/0096010 A1 5/2007 Pallaro et al.
2016/0259038 A1 9/2016 Retterath et al.
2018/0017668 A1 1/2018 Cottin et al.
2018/0081041 A1 3/2018 Niclass et al.
2018/0095165 A1 4/2018 Cohen et al.
2018/0143320 A1* 5/2018 Steever .................... G01S 17/89
2018/0259624 A1 9/2018 Kiehn et al.
2019/0011567 A1* 1/2019 Pacala ..................... G01S 17/88
2019/0212416 A1 7/2019 Li et al.
(Continued)

FOREIGN PATENT DOCUMENTS

CN 107422336 A 12/2017
CN 110336183 A 10/2019
(Continued)

*Primary Examiner* — Yuqing Xiao
(74) *Attorney, Agent, or Firm* — Vivacqua Crane, PLLC

(57) ABSTRACT

In an apparatus for acquiring image data, a transmission unit comprising a plurality of transmission elements and a reception unit comprising reception pixels are provided, wherein a reception optics, by which the image of all the partial scenes of a field of view is superposed onto an imaging region, is arranged between the transmission unit and the reception unit.

27 Claims, 9 Drawing Sheets

(56) References Cited

U.S. PATENT DOCUMENTS

| | | | | |
|---|---|---|---|---|
| 2019/0271767 | A1 | 9/2019 | Keilaf et al. | |
| 2019/0302246 | A1* | 10/2019 | Donovan | G01S 17/08 |
| 2021/0080548 | A1 | 3/2021 | Beuschel et al. | |

FOREIGN PATENT DOCUMENTS

| | | | |
|---|---|---|---|
| DE | 102005053361 | A1 | 5/2007 |
| DE | 602005004544 | T2 | 4/2008 |
| DE | 102010054078 | A1 | 11/2011 |
| DE | 102016004334 | A1 | 10/2017 |
| DE | 102017222970 | A1 | 6/2019 |
| DE | 102019215136 | A1 | 4/2020 |
| EP | 3382421 | A1 | 10/2018 |
| WO | 2019125349 | A1 | 6/2019 |

* cited by examiner

METHOD AND DEVICE FOR ACQUIRING IMAGE DATA

This application is a national stage filing under 35 U.S.C § 371 of international application number PCT/EP2021/059231, filed Apr. 8, 2021, which claims priority to German application number 102020110052.3 filed Apr. 9, 2020. The contents of these applications are incorporated herein by reference in their entirety.

The present invention relates to a method and to an apparatus for acquiring image data.

Figure 1:
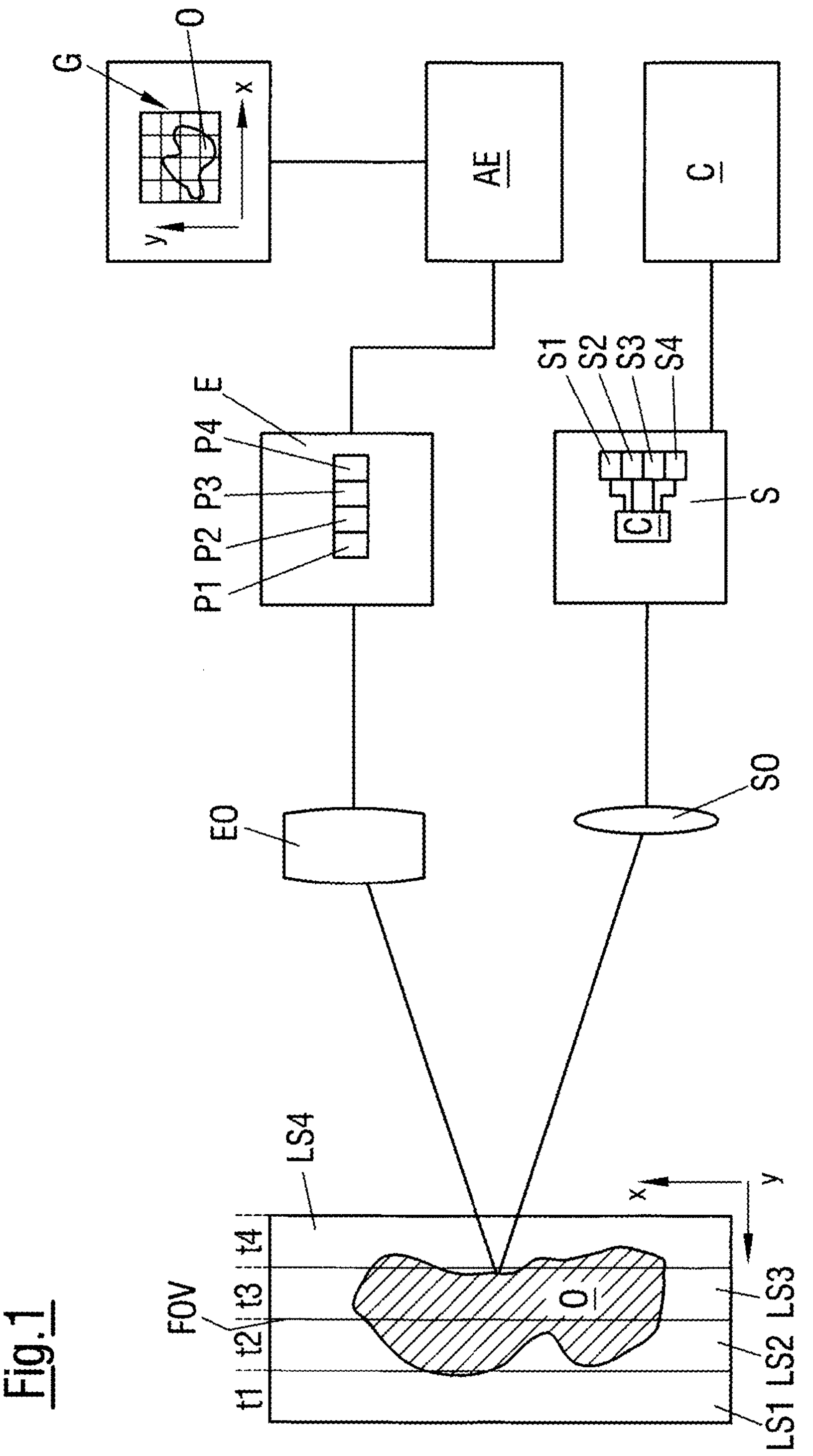

Such methods and apparatus are inter alia used in the field of autonomous driving in LIDAR systems. FIG. 1 purely schematically shows such an apparatus known from the prior art, comprising a transmission unit S comprising a plurality of transmission elements S1-S4 arranged in at least one row, a reception unit E comprising reception pixels P1-P4 arranged in a row, and at least one reception optics EO arranged between the transmission unit and the reception unit. In this respect, a single transmission element S1 can transmit a light pulse or a radiation pulse that is reflected by an object O in a field of view FOV and that reaches the reception pixels P1-P4. Even though the transmitted radiation usually lies in the non-visible wavelength range, the terms light and radiation are used synonymously in the following for a simplified representation. To measure the distance, the time of flight of the light pulse is determined and an assembled total image G of the field of view FOV can be created from a large number of measurements based due to the different times of flight. In this so-called time of flight (ToF) process, the transmission elements S1-S4 are usually arranged beneath one another in a row, for example a vertical row, wherein each transmission element is successively controlled in a pulse-like manner by a control unit C. Due to a transmission optics SO, the light of each transmission element is formed into a light strip, for example a horizontally oriented light strip (cf. FIG. 2), that illuminates the field of view FOV in partial scenes LS1-LS4 in temporally consecutive time windows t1-t4. The light is reflected by an object O located in the field of view FOV and is reflected back in the direction of the reception unit E. In the reception unit E, a plurality of reception pixels P1-P4 are arranged next to one another in a row, as shown in FIG. 1, so that the light of each partial scene can be reflected by the object O and can be detected as light strips by the reception pixels. Subsequently, the time of flight of the light between the transmission of the pulse and the incidence on the individual reception pixels is determined by an evaluation device AE and the distance from the respective reflection point is calculated from the time of flight. Since further individual transmission elements then successively emit a light pulse, further partial scenes LS2-LS4 are successively illuminated in the time windows t2-t4. Their light is likewise reflected by the object O and detected by the reception pixels so that a two-dimensional image G of the field of view FOV and of the object O located therein can subsequently be assembled in a known manner from the calculated distance data.

It is the object of the present invention to provide a method and an apparatus for acquiring image data by which an improved resolution can be achieved with an at least unchanged construction size.

In accordance with a first aspect of the present invention, this object is satisfied by a method for acquiring image data that comprises the following steps: providing a transmission unit comprising a plurality of transmission elements arranged in at least one row, a reception unit comprising reception pixels arranged in rows and columns, and at least one reception optics arranged between the transmission unit and the reception unit; illuminating a first partial scene of a field of view using a first transmission element during a first time window; illuminating a further partial scene of the field of view using another transmission element during a further time window; wherein light reflected by an object in the respective partial scene is projected simultaneously onto all the reception pixels by the reception optics during each time window; wherein the image data received successively in time by the reception pixels in the time windows are read out and combined to form a total image; and wherein no moving parts are used in an optical path between the field of view and the reception unit.

It is achieved by this procedure that, on an illumination of each partial scene by a transmission element comprising only one light pulse, all the reception pixels are simultaneously illuminated through the specific design of the reception optics so that not only one row or column of reception pixels, but all the reception pixels of the reception unit are simultaneously illuminated. Due to a temporally consecutive illumination of the partial scenes of the field of view, the image data received successively in time by the reception pixels in the consecutive time windows can be successively read out and combined to form a total image. For this purpose, during each individual time window, the light of the respective partial scene reflected by an object located in the field of view is simultaneously projected onto all the reception pixels of the reception unit by the reception optics within the time window. The resolution can hereby be increased without moving parts such as rotating mirrors or the like having to be used in the optical path between the field of view and the reception unit, whereby low manufacturing costs and an increased reliability can be achieved.

Advantageous embodiments of the invention are described in the description, in the drawing, and in the dependent claims.

In accordance with a first advantageous embodiment, the reflected light of all the partial scenes can be superposed and projected onto a single imaging region, in which all the reception pixels are located, by the reception optics in order to increase the resolution. This enables the use of a large number of reception pixels whose totality is used to evaluate the reflected light of each partial scene.

In accordance with a further advantageous embodiment, at least two part regions of a partial scene arranged next to one another are projected onto the reception pixels of the reception unit by the reception optics such that they are arranged there beneath one another and/or spaced apart. The possibility hereby exists of varying the resolution of the total image of the field of view in the x direction and in the y direction with the aid of the reception optics. Similarly, the reception optics can be configured such that at least two part regions of a partial scene arranged beneath one another are projected onto the reception pixels of the reception unit such that they are arranged there next to one another and/or spaced apart.

In other words, the reception optics can perform a desired mapping to effect a different resolution in certain regions of the assembled total image. Due to a different design of the reception optics, an adaptation of the resolution can thus take place with the same dimension of the transmission and reception pixels. Due to the reception optics, the assembled total image can hereby, for example, be designed in accordance with a further advantageous embodiment such that it has an increased resolution in the y direction at its two side margins.

The reception optics can comprise a plurality of individual lenses, but can in particular also consist of a single component. The reception optics can have an arrangement of focusing elements and can, for example, be designed as a facet lens or a microlens array, wherein the arrangement does not necessarily have to follow a regular grid. In addition to transmissive optics, reflective optics, e.g. facet mirrors, can also be used. Furthermore, the reception optics can have further optical components, e.g. field lenses or focusing elements.

In accordance with a further advantageous embodiment, adjacent partial scenes can be successively illuminated, which facilitates the subsequent assembly of the total image.

In accordance with a further advantageous embodiment, the number of illuminated partial scenes can correspond to the number of transmission elements. In this case, a respective one partial scene is illuminated by a transmission element during a time window. However, it can occur in this respect that, on a temporally consecutive illumination of adjacent partial scenes, a so-called overlighting takes place, i.e. the light radiated into one partial scene of the field of view also (unintentionally) illuminates a part of an adjacent partial scene, which can lead to inaccuracies in the image data acquisition.

In accordance with a further advantageous embodiment, in order to prevent such an overlighting, the number of transmission elements can be larger and in particular twice as large as the number of illuminated partial scenes. In this embodiment, an individual partial scene can first be illuminated by a first transmission element and can be illuminated by a second transmission element in a subsequent time window, wherein the illumination can take place such that in each case only one part region of the same partial scene is illuminated in each time window. Accordingly, only a predetermined portion of the reception pixels can be read out in each time window so that an overlighting of the reception pixels that are not read out is harmless. Thus, two part regions of a partial scene disposed above one another can, for example, be successively illuminated during two consecutive time windows, wherein either only the upper or only the lower half of the reception pixels is read out in each time window. A first contiguous region of the reception pixels is hereby read out in a first time window and another contiguous region of the reception pixels, which is adjacent to the first region, is read out in the subsequent time window. In this method, a larger quantity of transmission elements is indeed required, twice the quantity in the embodiment described, and twice the number of time windows is required, but it can be effectively prevented that overlighted part regions reach the reception pixels, which would otherwise result in a distorted image representation.

In accordance with a further embodiment, a further possibility of preventing an evaluation of undesirably illuminated part regions is covering at least one partial scene of the field of view in the reception optics or in the optical path between the field of view and the reception optics. In this way, it can likewise be prevented that light from an overlighted part region reaches the reception device.

In accordance with a further advantageous embodiment, such a cover can only be implemented in that, during each time window, only the reflected light of a predetermined part region of an illuminated partial scene is directed onto the reception pixels. Thus, the reception optics can, for example, be masked by mechanical or electronic means so that only a predetermined section of the reflected radiation, for example a section corresponding to a partial scene, is ever released. This can, for example, be implemented by a rolling aperture that—for example with the aid of LCD technology—provides only a predetermined transparent window that transmits light in the direction of the reception unit and that is moved synchronously to the control of the transmission elements so that in each case only light from the illuminated partial scene reaches the reception pixels.

In accordance with a further aspect of the present invention, it relates to an apparatus, in particular for carrying out a method in accordance with at least one of the preceding claims, comprising a transmission unit comprising a plurality of transmission elements arranged in at least one row, a reception unit comprising reception pixels arranged in rows and columns, and at least one reception optics that is arranged between the transmission unit and the reception unit and that detects a plurality of partial scenes of the light reflected by an object in a field of view and superposes them to form a single imaging region. In this respect, the reception optics can simultaneously project the imaging region onto all the reception pixels so that, on an illumination of only one partial scene, all the reception pixels of the reception unit are nevertheless illuminated, whereby the resolution is increased. In a manner known per se, an evaluation device can combine the image data of all the partial scenes received successively by the reception unit to form a total image, wherein the reception optics can in particular be configured such that the assembled total image has a different resolution in different directions. Thus, the reception optics can, for example, be configured such that the assembled total image has an increased resolution in the vertical direction at its two side margins.

Figure 2:
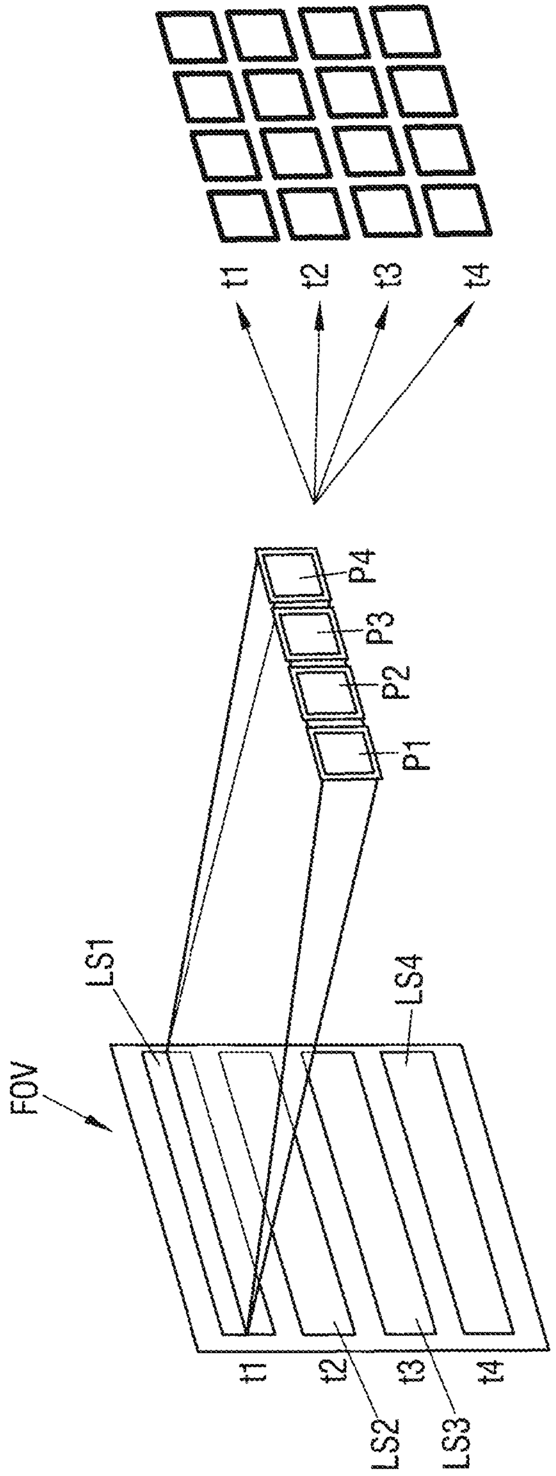
Figure 3:
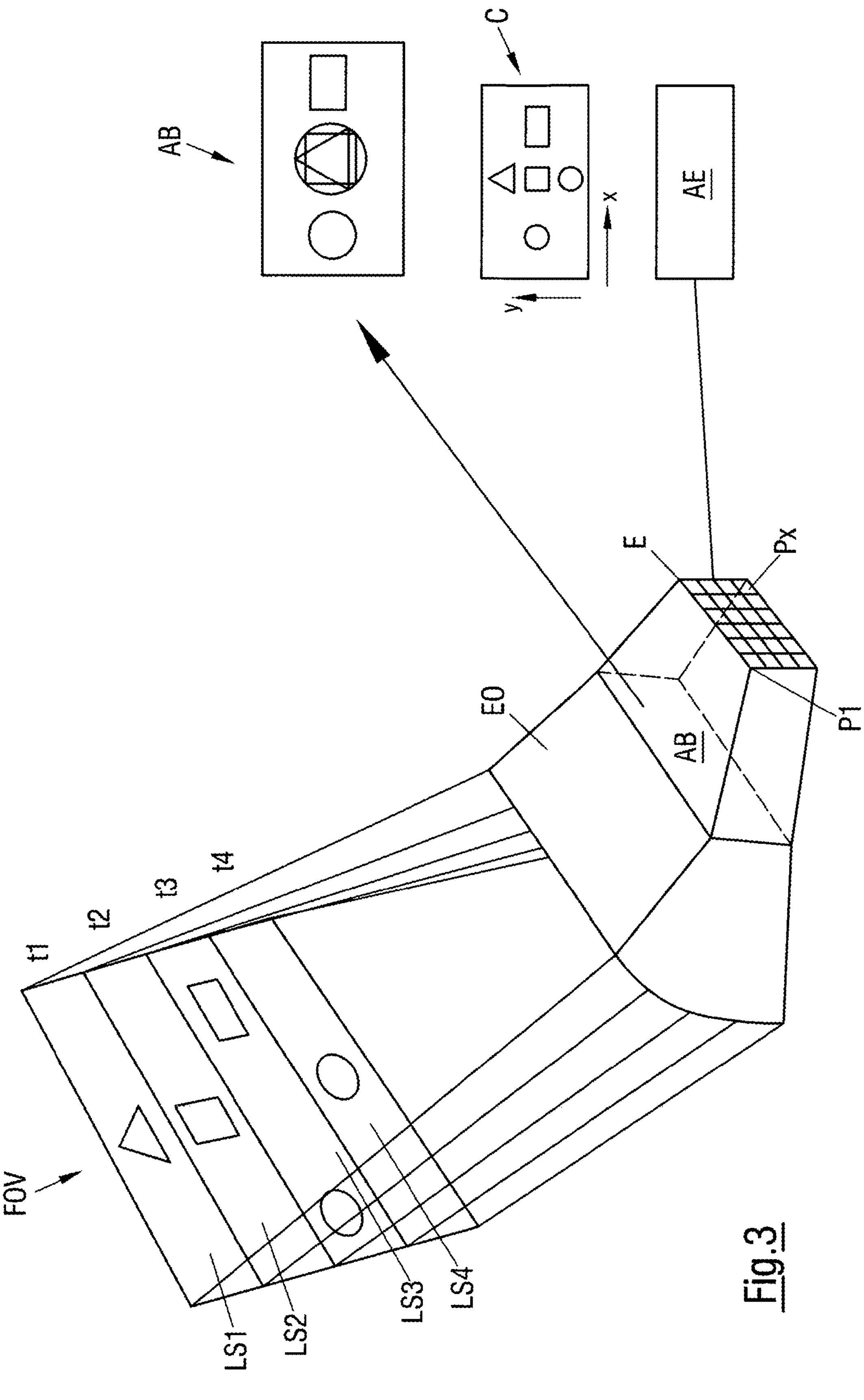
Figure 4:
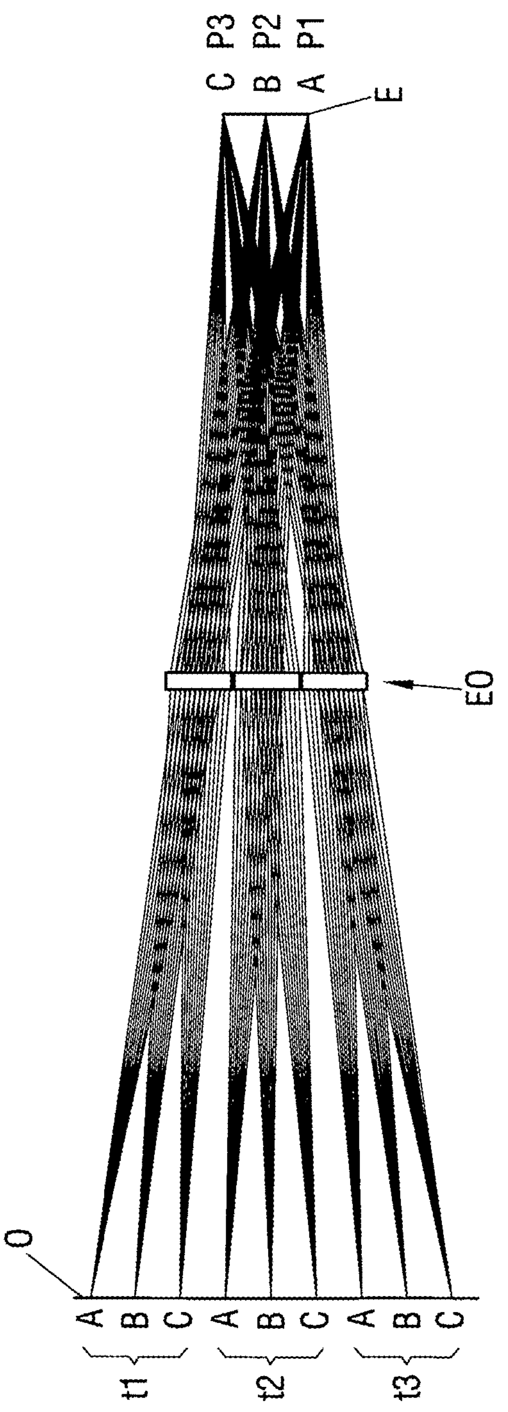
Figure 5:
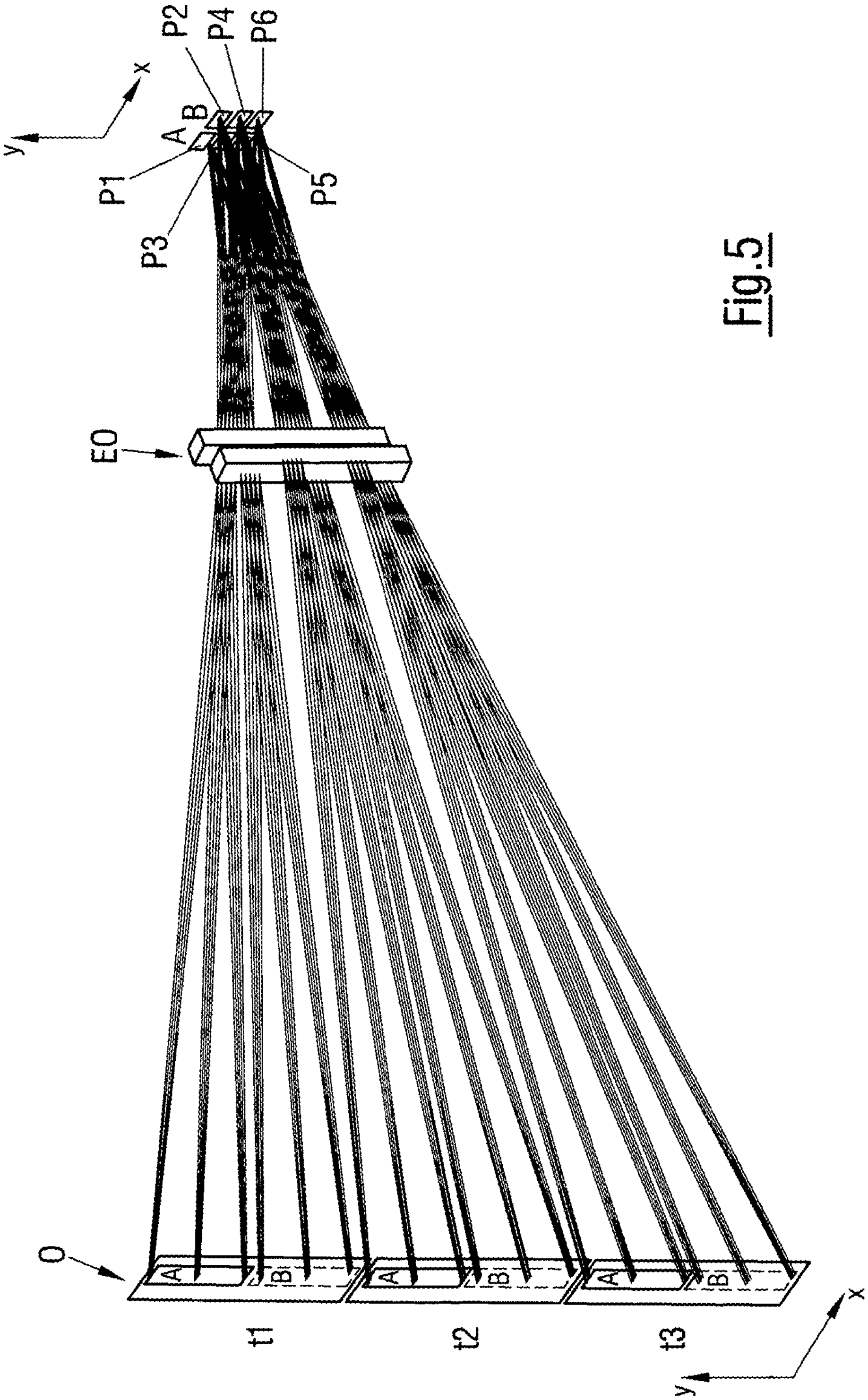
Figure 6:
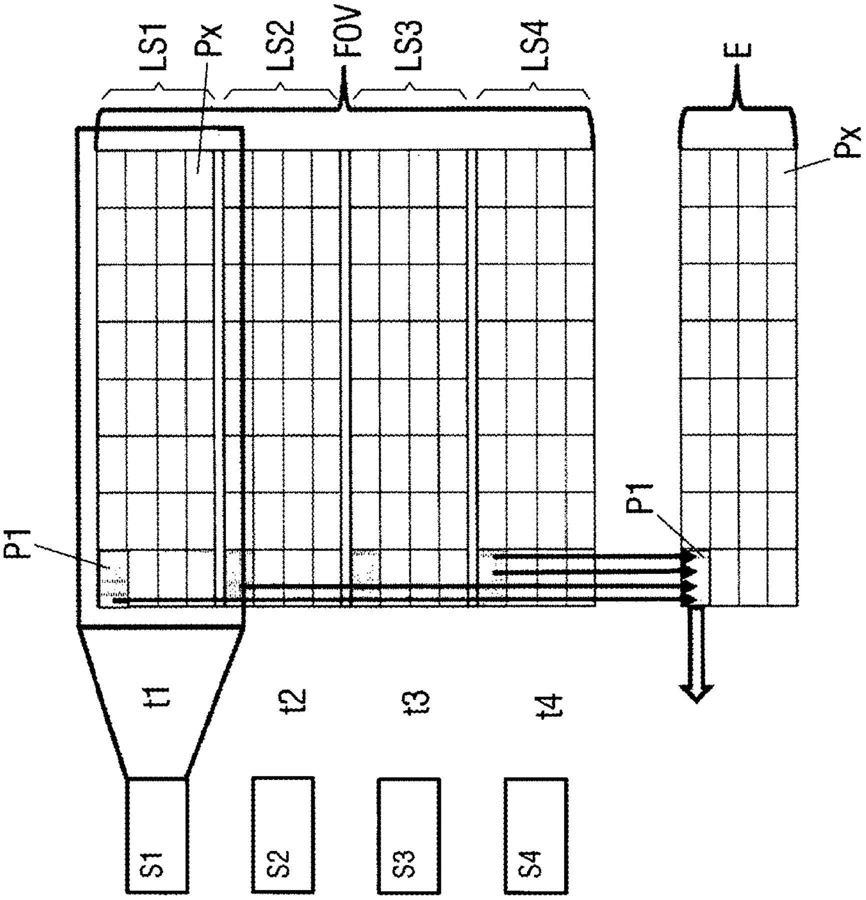
Figure 7:
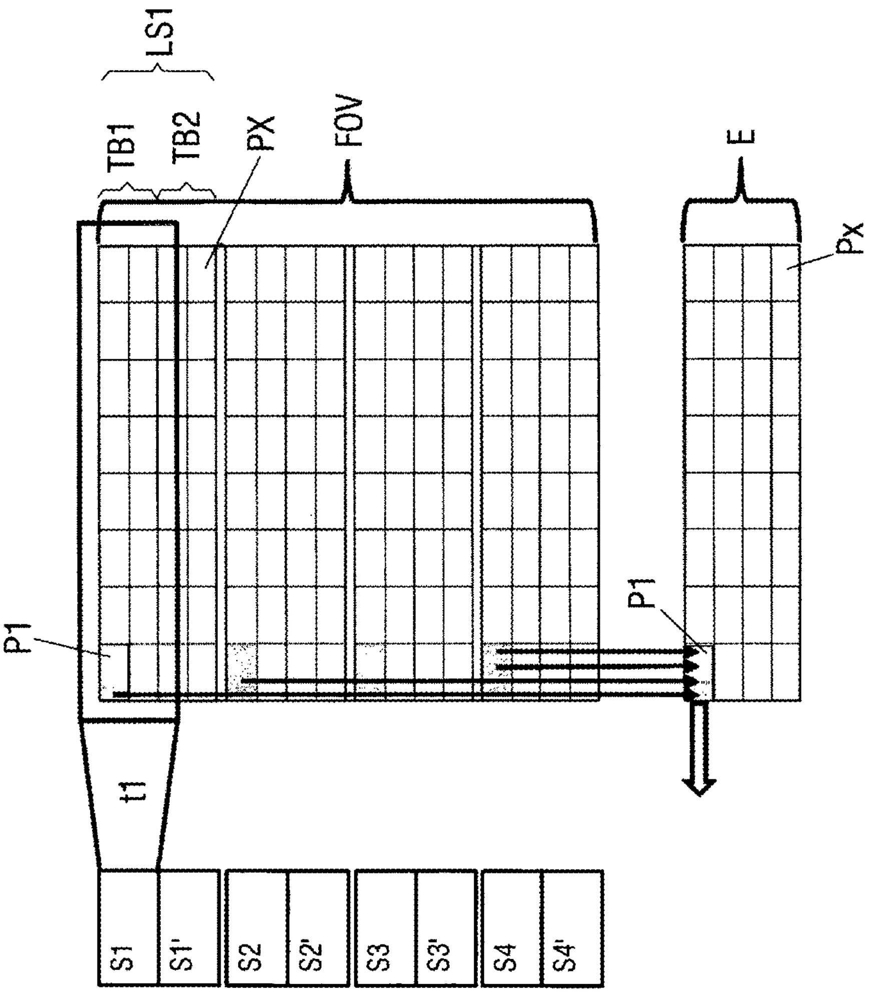
Figure 8:
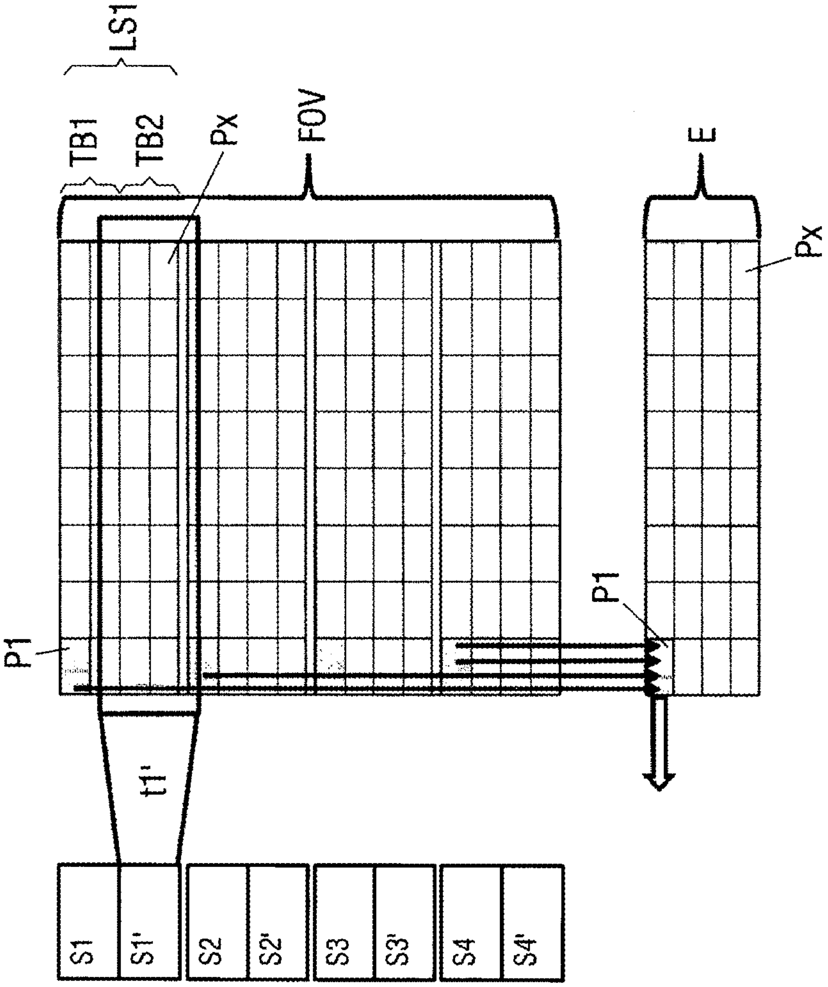
Figure 9:
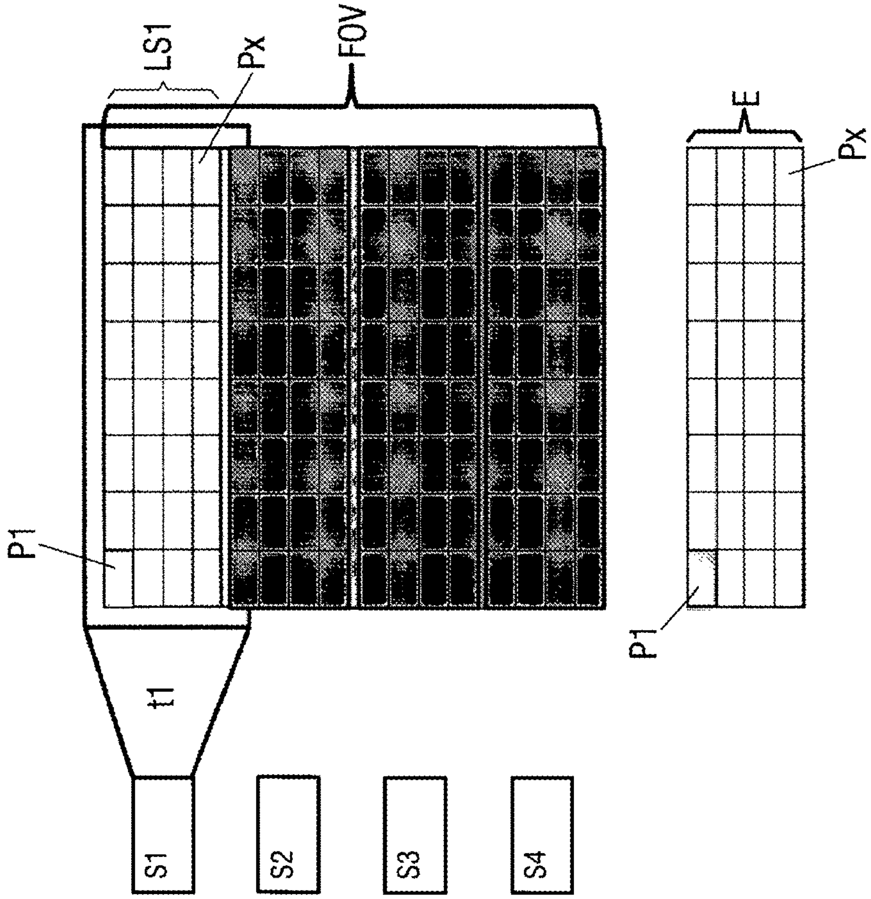

The present invention will be described in the following purely by way of example with reference to an advantageous embodiment and to the enclosed drawings. There are shown:

FIG. 1 a schematic representation of an arrangement in accordance with the prior art;

FIG. 2 the acquisition of image data using the arrangement of FIG. 1;

FIG. 3 a part of an apparatus between the field of view and the reception device for acquiring image data;

FIG. 4 an optical path of a further apparatus for acquiring image data between the field of view and the reception device;

FIG. 5 an optical path of a further apparatus for acquiring image data between the field of view and the reception device;

FIG. 6 a representation that illustrates the effect of the overlighting of individual partial scenes;

FIG. 7 a representation for acquiring image data of a first part region of a partial scene in a first time window;

FIG. 8 a representation for acquiring image data of a second part region of the partial scene in a second time window; and FIG. 9 an arrangement for acquiring image data using a cover device.

FIG. 1 shows a representation of an apparatus for acquiring image data in accordance with the prior art in which locally adjacent partial scenes LS1 to LS4 are illuminated in a field of view FOV, in which at least one object O is located, by a respective one transmission element S1-S4, for example a laser diode, in temporally consecutive time windows t1 to t4. The illumination of the partial scenes, for example, takes place in the form of adjacent horizontal light strips that are generated by a transmission optics SO. The individual transmission elements S1-S4 are triggered successively in time in a flash-like manner by a control C so that a respective one light strip is illuminated on the object O during a time window.

As FIG. 2 illustrates, the light reflected by the object O in the time window t1 is reflected back onto a row of reception pixels P1 to P4 and the time of flight between the emission of the light pulse and the incidence of the light pulse on the reception pixels P1 to P4 is determined with the aid of an evaluation device AE to be able to calculate the distance between each reception pixel and the object O therefrom. In the next time window t2, another (adjacent) transmission element S2 illuminates an adjacent partial scene LS2 and thus a region of the object O adjacent to the partial scene LS1. The light of the partial scene LS2 and subsequently also of the following partial scenes LS3 and LS4 reflected by the object is then projected onto the reception pixels P1 to P4 again by the reception optics EO so that a time of flight can be determined for each reception pixel at the time windows t1 to t4. The individual times of flight are subsequently converted into distances by the evaluation device AE and a two-dimensional assembled image G comprising (in the embodiment shown) sixteen pixels arranged in a matrix can then be created or calculated in a known manner from the individual distance values.

It is understood that in the above example and also in the embodiments described below, the number of all the transmission elements and all the reception pixels in all the rows, lines, or columns is only exemplary.

FIG. 3 shows a schematic representation of an apparatus in accordance with the invention for acquiring image data in accordance with the invention. In this respect, the illumination of the individual partial scenes LS1 to LS4 takes place in the same manner as in the arrangement of FIG. 1. In accordance with the invention, a transmission unit S comprising a plurality of transmission elements S1-S4 (e.g. laser diodes) arranged in at least one row is therefore also provided, wherein the light pulse of each transmission element is transformed by the transmission optics SO into a light strip that illuminates a field of view FOV in spatially adjacent partial scenes LS1 to LS4 in temporally consecutive time windows t1-t4. From objects within the field of view FOV, the light is reflected by objects in each partial scene LS1-LS4 and is imaged onto an imaging region AB by a reception optics EO. The imaging region AB is then projected onto a reception unit E that has reception pixels P1-Px arranged in rows and columns. The reception unit E is connected in the same manner as in the apparatus of FIG. 1 to an evaluation device AE that combines image data received successively in time by the reception unit E to form a total image G.

In FIG. 3, different objects within the field of view FOV are shown in the different partial scenes LS1-LS4 and are only shown as geometric objects in the form of a triangle, a square, a rectangle, and two circles for a simplified representation. The special feature of the reception optics EO used in accordance with the invention is now that it simultaneously projects the light reflected by all the objects in all the partial scenes onto all the reception pixels P1-Px of the reception unit. The reception optics EO thus "sees" all the partial scenes LS1-LS4 of the field of view FOV at all points in time, but superposes the reflected light of all the partial scenes onto a single imaging region AB that is then projected onto all the reception pixels P1-Px of the reception unit E. This results in the images of all the partial scenes being superposed to form an imaging region AB so that all the geometric objects in the individual partial scenes are superposed in the imaging region AB, as can be seen at the right in FIG. 3 in the enlarged representation.

To acquire the image data using the apparatus shown in FIG. 3, the first partial scene LS1 in the field of view FOV is first illuminated by the first transmission element S1 during a first time window t1 so that the light reflected by the triangular object in the partial scene LS1 is projected onto the imaging region AB. This light is projected onto all the reception pixels P1-Px of the reception unit E by the reception optics EO during the time window t1 and the image data generated thereby are read out by the evaluation device AE. Only the adjacent partial scene LS2 is subsequently illuminated by the second transmission element S2 during a subsequent time window t2 and the light reflected by the square object in the partial scene LS2 is imaged onto the imaging region AB and projected onto all the reception pixels. The individual partial scenes are therefore illuminated successively in time and in particular in a flash-like manner, wherein the control C of the transmission elements is configured such that it controls the transmission elements in an alternating and successive manner in a predetermined sequence. The evaluation device AE can then read out the image data received successively in time by the reception pixels in the time windows and can combine them to form a total image G.

Since, in accordance with the invention, no moving parts are used in the optical path between the field of view FOV and the reception unit E in the method described and the apparatus described, a high precision can be achieved at a low cost.

FIG. 4 shows a further embodiment in which the reception optics EO is configured such that the light reflected by an object O in a partial scene in time windows t1, t2, and t3 is simultaneously projected onto three reception pixels P3, P2, and P1 arranged beneath one another in a corresponding manner to the part regions C, B, and A and onto a plurality of reception pixels (not shown) arranged next to one another. The resolution of the apparatus for acquiring image data can hereby be further increased.

FIG. 5 shows a further embodiment in which the transmission optics SO is configured such that a vertical light strip projected onto the object O by a respective one transmission element in different time windows t1, t2, and t3 is imaged onto six reception pixels P1-P6, for example. Each partial scene has two part regions A and B disposed above one another in each time window t1-t3.

In this embodiment, the reception unit E has a total of six reception pixels P1-P6 that are arranged in three rows and two columns. In this respect, the reception pixels P1, P2, and P3 are located in one column and the reception pixels P2, P4, and P6 are located in a further column disposed next to it.

In this embodiment, the reception optics EO is configured such that each part region A and B of a partial scene disposed beneath or above one another is projected from an object O onto the reception pixels such that the reflected radiation of the part region A is incident on the reception pixels P1, P3, and P5, whereas the part region B is imaged onto the reception pixels P2, P4, and P6. The part regions A and B disposed above or beneath one another on the object O are hereby imaged on the reception pixels of the reception unit such that they are disposed next to one another there and are projected onto three reception pixels by way of example. The resolution of the assembled total image in the y direction is hereby increased compared to the x direction.

With reference to FIG. 6, the problem of the overlighting of individual partial scenes will be described in the following.

As explained above, in the method in accordance with the invention, individual partial scenes of a field of view are successively illuminated, in particular in a strip-like manner, and the light reflected by the illuminated partial scene is projected via the reception optics onto all the reception pixels. Since the total field of view is indeed simultaneously projected onto all the reception pixels, but only one partial scene is always illuminated, the reception unit normally always only registers the light reflected by one partial scene in consecutive time windows. Thus, it is, for example, shown in FIG. 6 that only the transmission element S1 illuminates the partial scene LS1, wherein the light of the total partial scene LS1 is projected onto the reception unit E comprising all the pixels P1-Px with the aid of the reception optics EO. As indicated in FIG. 6, it is, however, not always possible in practice to illuminate each partial scene exactly up to the adjoining partial scene that is actually not to be illuminated within the current time window. In this regard, the aforementioned overlighting can occur during which the light intended for the partial scene LS1 radiates into the adjacent partial scene LS2. However, this results in the reception pixels in the top row of the reception unit E being (fully) illuminated in the first partial scene LS1, but also (partly) receiving light in the adjacent partial scene LS2. However, since all the partial scenes are always superposed on the single imaging region AB by the reception optics E in accordance with the invention, this leads to the reception pixels in the top row of the reception unit E receiving reflections that not only originate from the partial scene LS1, but also partly from the partial scene LS2, which can lead to incorrect results.

A solution to this problem can comprise alternately illuminating each partial scene using more than one transmission element, but reading out only a portion of the reception pixels within each time window in this respect. Thus, a first contiguous region of the reception pixels may, for example, be read out in a first time window and another contiguous region of the reception pixels, which is adjacent to the first region and which illuminates the same partial scene, may be read out in the subsequent time window. Thus, in the arrangement of FIG. 7, two transmission elements S1 and S1' to S4, S4' are provided for each partial scene, wherein a respective two of the transmission elements are provided for illuminating different part regions TB1 and TB2 of one and the same partial scene LS1. Thus, the transmission element S1, for example, illuminates the upper part region TB1 of the partial scene LS1 (FIG. 7) in the time window t1 and the transmission element S1' illuminates the lower part region TB2 of the partial scene LS1 in the subsequent time window t1' (FIG. 8). However, to avoid the problem of overlighting, only the reception pixels arranged in the upper half, i.e. in the embodiment shown only the reception pixels arranged in the two upper rows, are read out on an activation of the transmission element S1. In contrast, the two lower rows of the reception unit E remain inactive at this point in time. Conversely, the two upper rows of the reception pixels are switched inactive when the partial scene LS1 is illuminated in its lower part region by the transmission element S1'. With this procedure, twice the number of transmission elements are indeed required and two illumination sequences have to be run through for each partial scene. However, the problem of cross-fading is no longer present.

A further solution to avoid misinformation due to cross-blending is explained in connection with FIG. 9. In this variant, a cover device, by which at least one adjacent partial scene of the field of view FOV is covered, is provided either in the region of the reception optics EO, or also integrated into the reception optics EO, or also in the optical path between the field of view FOV and the reception optics EO. As illustrated in FIG. 9, on an illumination of the partial scene LS1 by the transmission element S1, the region of all the adjacent partial scenes LS2 to LS4 is covered or masked so that the imaging region AB actually receives only reflected radiation from the first partial scene LS1. This masking can, for example, be provided by a mechanical aperture or also by an electronic aperture, i.e. by a transparent transmission window that in each case transmits reflected radiation from only one desired partial scene. Thus, a rolling window can, for example, be integrated into the reception optics EO with the aid of an LCD shading device, said rolling window being synchronized in time with the control C of the transmission elements so that in each case only reflected light is transmitted from the currently illuminated partial scene to the imaging region AB.

Since the control C successively controls the individual transmission elements S1-S4 in a predetermined sequence and the evaluation device AE combines the image data received successively in time by the reception unit E to form a total image G, high-resolution two-dimensional images can be created that have an extent in the x direction (image width) and in the y direction (image height) that have different resolutions.

The invention claimed is:

1. A method for acquiring image data, the method comprising the following steps:

a) providing a transmission unit comprising a plurality of transmission elements arranged in at least one row, a reception unit comprising reception pixels arranged in rows and columns, and at least one reception optics arranged between the transmission unit and the reception unit;

b) illuminating a first partial scene of a field of view using a first transmission element during a first time window;

c) illuminating a further partial scene of the field of view using another transmission element during a further time window; wherein d) light reflected by an object in the respective partial scene is projected simultaneously onto all the reception pixels by the reception optics during each time window;

e) the light projected simultaneously onto all of the reception pixels is received simultaneously by all of the reception pixels thereby generating image data during each time window;

f) the image data received successively in time by the reception pixels in the time windows are read out and combined to form a total image; and g) no moving parts are used in an optical path between the field of view and the reception unit.

2. The method in accordance with claim 1, wherein the reflected light of all the partial scenes is superposed and projected onto a single imaging region by the reception optics in order to increase the resolution.

3. The method in accordance with claim 1, wherein at least two part regions of a partial scene arranged next to one another are projected onto the reception pixels of the reception unit by the reception optics such that they are arranged there beneath one another and/or spaced apart.

4. The method in accordance with claim 1, wherein at least two part regions of a partial scene arranged beneath one another are projected onto the reception pixels of the reception unit by the reception optics such that they are arranged there next to one another and/or spaced apart.

5. The method in accordance with claim 1, wherein adjacent part regions of a partial scene are projected onto a different number of reception pixels by the reception optics.

6. The method in accordance with claim 1, wherein adjacent partial scenes are successively illuminated.

7. The method in accordance with claim 1, wherein a facet lens is used as the reception optics.

8. The method in accordance with claim 1, wherein the number of illuminated partial scenes corresponds to the number of transmission elements.

9. The method in accordance with claim 1, wherein the number of transmission elements is larger than the number of illuminated partial scenes.

10. The method in accordance with claim 9, wherein different part regions of a partial scene are successively illuminated by a first and a second transmission element during two consecutive time windows, with only some of the reception pixels being read out in each time window.

11. The method in accordance with claim 10, wherein a first contiguous region of the reception pixels is read out in a first time window and another contiguous region of the reception pixels, which is adjacent to the first region, is read out in a subsequent time window.

12. The method in accordance with claim 1, wherein at least one partial scene of the field of view is covered in the reception optics or in the optical path between the field of view and the reception optics.

13. The method in accordance with claim 1, wherein during each time window, only the reflected light of a predetermined part region of an illuminated partial scene is directed onto the reception pixels.

14. An apparatus comprising a transmission unit comprising a plurality of transmission elements arranged in at least one row, a reception unit comprising reception pixels arranged in rows and columns, and at least one reception optics that is arranged between the transmission unit and the reception unit and that detects a plurality of partial scenes of the light reflected by an object in a field of view and superposes them to form a single imaging region, wherein the reception optics simultaneously projects the imaging region onto all the reception pixels, and wherein the light projected simultaneously onto all of the reception pixels is received simultaneously by all of the reception pixels.

15. The apparatus in accordance with claim 14, further comprising an evaluation device that combines image data received successively in time by the reception unit to form a total image having an x direction and a y direction, with the reception optics being configured such that the assembled total image has a different resolution in the x direction and/or the y direction.

16. The apparatus in accordance with claim 15, wherein the reception optics is configured such that the assembled total image has an increased resolution in the y direction at its two side margins.

17. The apparatus in accordance with claim 14, wherein the reception optics is configured such that at least two part regions of a partial scene arranged next to one another are arranged beneath one another and/or spaced apart on the reception pixels of the reception unit.

18. The apparatus in accordance with claim 14, wherein a control is provided that controls the transmission elements in an alternating and successive manner in a predetermined sequence.

19. The apparatus in accordance with claim 14, wherein the reception optics comprises a facet lens.

20. The apparatus in accordance with claim 14, wherein it has no moving components in the optical path between the field of view and the reception unit.

21. The apparatus in accordance with claim 14, further comprising a cover device in the reception optics or in the optical path between the field of view and the reception optics, the cover device covering at least one partial scene of the field of view.

22. The apparatus in accordance with claim 14, further comprising a cover device in the reception optics or in the optical path between the field of view and the reception optics, the cover device transmitting the reflected light from only one partial scene of the field of view to the reception device.

23. The apparatus in accordance with claim 21, wherein the cover device comprises a mechanical or electronic aperture.

24. The apparatus in accordance with claim 21, wherein the cover device is synchronized in time with a control of the transmission elements.

25. The apparatus in accordance with claim 22, wherein the cover device is synchronized in time with a control of the transmission elements.

26. The apparatus in accordance with claim 14, wherein at least two part regions of a partial scene arranged beneath one another are arranged next to one another and/or spaced apart on the reception pixels of the reception unit.

27. The apparatus in accordance with claim 22, wherein the cover device comprises a mechanical or electronic aperture.

* * * * *